US009333941B2

(12) United States Patent
Ikeda

(10) Patent No.: US 9,333,941 B2
(45) Date of Patent: May 10, 2016

(54) POSITION DETECTOR, SEAT BELT RETRACTOR HAVING THIS POSITION DETECTOR, AND SEAT BELT APPARATUS HAVING THIS SEAT BELT RETRACTOR

(75) Inventor: Kenji Ikeda, Tokyo (JP)

(73) Assignee: Takata Corporation, Tokyo (JP)

(*) Notice: Subject to any disclaimer, the term of this patent is extended or adjusted under 35 U.S.C. 154(b) by 824 days.

(21) Appl. No.: 13/107,524

(22) Filed: May 13, 2011

(65) Prior Publication Data
US 2011/0278905 A1 Nov. 17, 2011

(30) Foreign Application Priority Data
May 17, 2010 (JP) .................................. 2010-113155

(51) Int. Cl.
*B60R 22/46* (2006.01)
*B60R 22/34* (2006.01)
*G01D 5/14* (2006.01)

(52) U.S. Cl.
CPC ............... *B60R 22/34* (2013.01); *G01D 5/145* (2013.01); *B60R 22/46* (2013.01)

(58) Field of Classification Search
CPC ................... B60R 2022/46; B60R 2022/4666; B60R 2022/469; G01B 7/14; G01B 7/30
USPC ............... 242/374, 390, 390.1, 390.8, 390.9; 280/806, 807; 297/475–478, 480; 324/173–174, 207.24, 207.25
See application file for complete search history.

(56) References Cited

U.S. PATENT DOCUMENTS

| 4,529,934 | A | * | 7/1985 | Heinrich | 324/173 |
|---|---|---|---|---|---|
| 5,930,905 | A | * | 8/1999 | Zabler et al. | 33/1 PT |
| 6,290,160 | B1 | | 9/2001 | Strobel | |
| 6,425,541 | B1 | | 7/2002 | Strobel | |
| 8,085,036 | B2 | * | 12/2011 | Ausserlechner | 324/207.25 |
| 8,893,998 | B2 | * | 11/2014 | Midorikawa et al. | 242/374 |
| 8,960,585 | B2 | * | 2/2015 | Ikeda et al. | 242/422.2 |
| 2006/0231663 | A1 | * | 10/2006 | Burkart et al. | 242/374 |
| 2008/0211442 | A1 | * | 9/2008 | Odate | 318/449 |
| 2009/0039872 | A1 | * | 2/2009 | Fischer | 324/207.13 |
| 2010/0072313 | A1 | | 3/2010 | Maemura et al. | |
| 2010/0072988 | A1 | * | 3/2010 | Hammerschmidt et al. | 324/207.25 |

FOREIGN PATENT DOCUMENTS

| JP | S57-046816 U | 3/1982 |
|---|---|---|
| JP | 2000-335368 A | 12/2000 |
| JP | 2000-344050 A | 12/2000 |
| JP | 2004-264136 A | 9/2004 |

(Continued)

*Primary Examiner* — Emmanuel M Marcelo
*Assistant Examiner* — Justin Stefanon
(74) *Attorney, Agent, or Firm* — Fitch Even Tabin & Flannery LLP

(57) ABSTRACT

A position detector is provided that can detect the position of a moving member with a higher degree of accuracy. In one form, a rotation sensor includes a magnet in which N-pole magnets and S-pole magnets are arranged alternately and circularly and that rotates in conjunction with the rotation of a spool, and first and second Hall elements and that are disposed apart from each other in the circumferential direction of the magnet and detect the poles of the N-pole magnets and S-pole magnets. In that case, the first and second Hall elements and are both unipolar detection type Hall elements that detect only the S-pole. The magnetization width of the S-pole magnets is set large, and the magnetization width of the N-pole magnets is set small.

9 Claims, 13 Drawing Sheets

(56) References Cited

FOREIGN PATENT DOCUMENTS

| | | | |
|---|---|---|---|
| JP | 2005-297781 A | 10/2005 | |
| JP | 2007-326513 A | 12/2007 | |
| JP | 2009-113718 A | 5/2009 | |
| WO | 2006/137247 A1 | 12/2006 | |
| WO | 2008/117820 A1 | 10/2008 | |

* cited by examiner

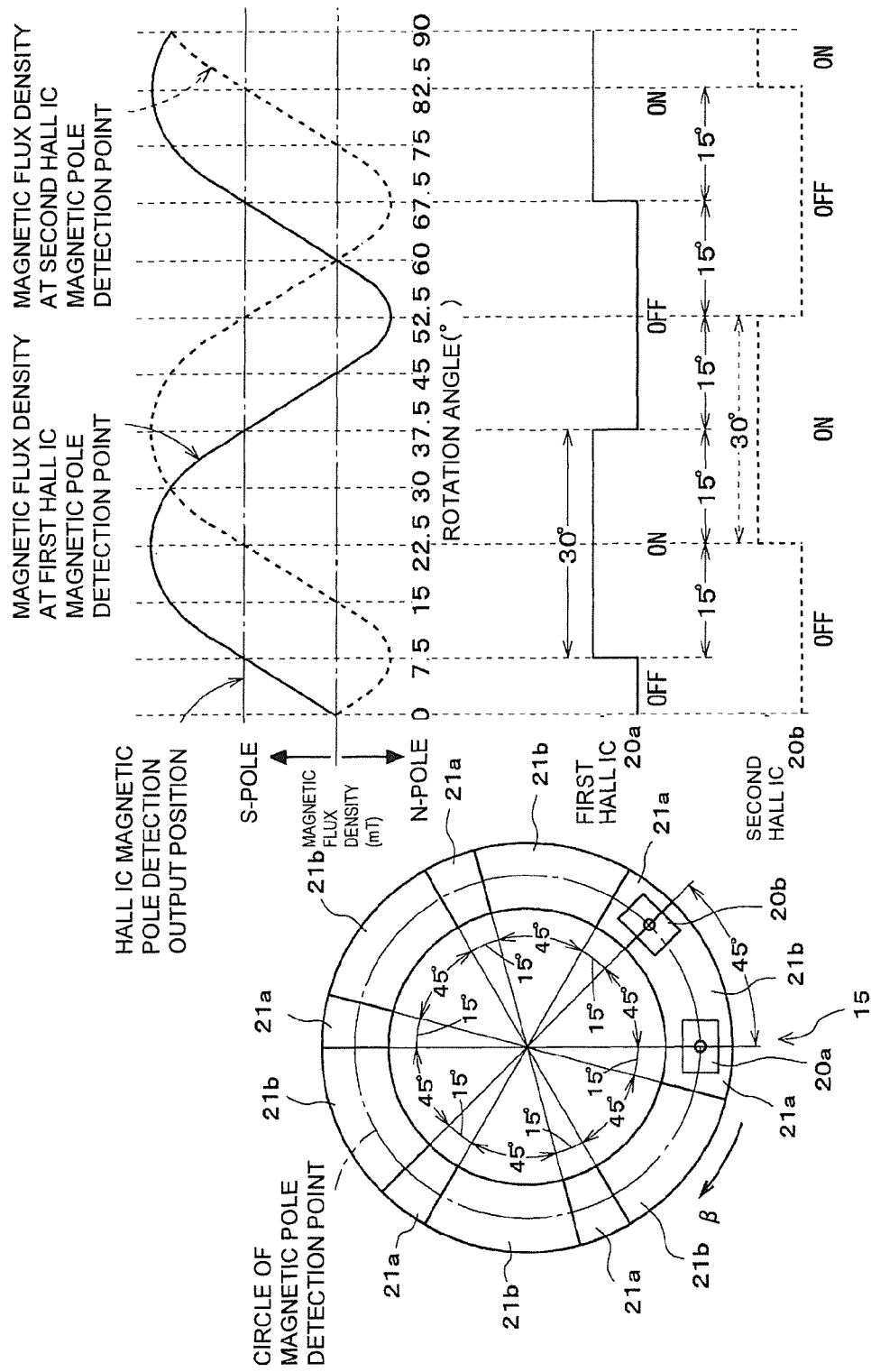

CIRCLE OF DETECTION POINT

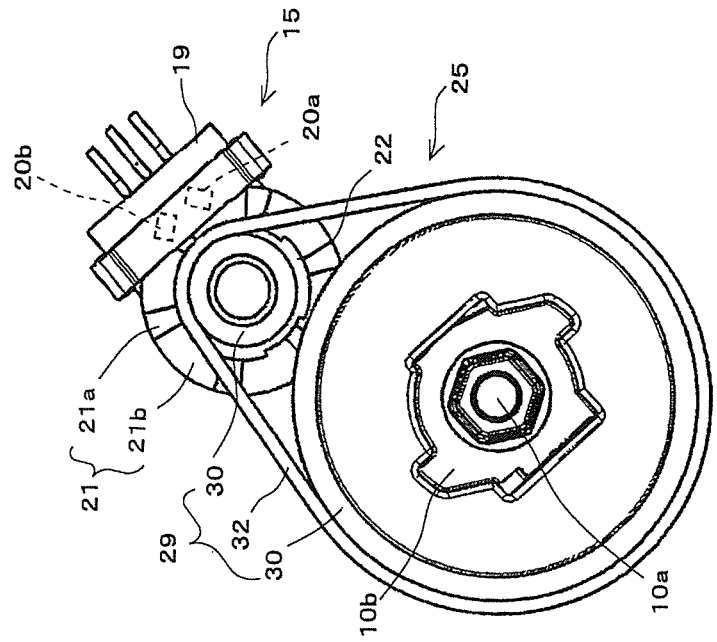
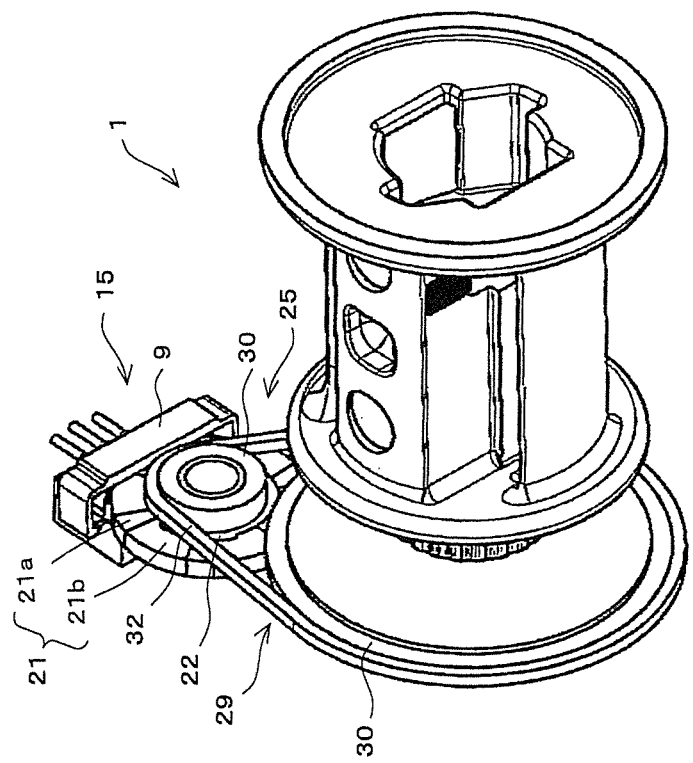
FIG. 6A
FIG. 6B

*Prior Art*

*Prior Art*

*Prior Art*

*Prior Art*

*Prior Art*

FIG. 12B

*Prior Art*

FIG. 12A

CIRCLE OF MAGNETIC POLE
DETECTION POINT

*Prior Art*

POSITION DETECTOR, SEAT BELT RETRACTOR HAVING THIS POSITION DETECTOR, AND SEAT BELT APPARATUS HAVING THIS SEAT BELT RETRACTOR

CROSS-REFERENCE TO RELATED APPLICATIONS

This application claims priority under 35 U.S.C. §119 to Japanese Patent Application No. JP2010-113155 filed on May 17, 2010, the entire content of which is hereby incorporated herein by reference in its entirety.

FIELD OF THE INVENTION

The present invention relates to the technical field of: a position detector including a unipolar detection type magnetic detecting member such as a Hall element that detects only the N-pole or S-pole, and a magnetic member in which N-poles and S-poles are arranged alternately and that moves in conjunction with the movement of a moving member (the term "moving member" includes a rotating member), wherein the position detector detects the position of the moving member by detecting only the N-poles or S-poles of the magnetic member using the magnetic detecting member; a seat belt retractor that detects the rotation amount of a spool using this position detector and thereby controls the rotation of the spool; and a seat belt apparatus having this seat belt retractor.

BACKGROUND OF THE INVENTION

Seat belt apparatuses, which have been installed in vehicles such as automobiles, restrain an occupant with a seat belt in an emergency such as a vehicle collision, thereby preventing the occupant from being thrown from their seat. Such seat belt apparatuses have a seat belt retractor that retracts the seat belt. In this seat belt retractor, the seat belt is retracted onto a spool when the seat belt is not fastened, and the seat belt is withdrawn and fastened by the occupant when the seat belt is fastened. In the above emergency, a lock mechanism of the seat belt retractor is activated and stops the rotation of the spool in the belt withdrawing direction, thereby preventing the seat belt from being withdrawn. Thus, the occupant is restrained by the seat belt in the emergency.

In conventional seat belt apparatuses, various belt tension modes are set according to the running state of the vehicle, the usage state of the seat belt apparatus, and the like. Many seat belt apparatuses are known that have, as a seat belt retractor, a motor retractor that rotates a seat belt retracting spool with the power of a motor. In this seat belt retractor, a controller controls an electric motor that is a driving means and thereby controls the belt retraction and belt withdrawal of the spool so that the belt is subjected to the belt tension of the belt tension mode set according to the running state of the vehicle, the usage state of the seat belt apparatus, and the like.

In the meantime, in order for the controller to control the belt retraction and belt withdrawal of the spool by controlling the driving of the electric motor, it is necessary to detect the rotation amount (rotational position) and rotation direction of the spool. So, there has been proposed a seat belt retractor having a rotation sensor detecting the rotation amount and rotation direction of a spool, the rotation sensor including: a rotating disk supported by the rotating shaft of the spool rotatably integrally with the spool; a magnet; and a Hall element (Hall IC) detecting the rotation of the rotating disk by detecting the magnet, the seat belt retractor controlling an electric motor on the basis of the rotation amount of the spool detected by the rotation sensor (see, for example, Japanese Unexamined Patent Application Publication No. 2009-113718).

FIG. 8 shows a seat belt apparatus described in Japanese Unexamined Patent Application Publication No. 2009-113718. FIG. 9 is a partial sectional view of a seat belt retractor described in Japanese Unexamined Patent Application Publication No. 2009-113718. FIG. 10A shows a ring-shaped magnet of a rotation sensor described in Japanese Unexamined Patent Application Publication No. 2009-113718. FIG. 10B is a partial view corresponding to part XB in FIG. 10A. FIG. 10C is a sectional view taken along line XC-XC in FIG. 10B. FIG. 11 illustrates the detection of rotation by the rotation sensor.

In FIGS. 8 to 11, reference numeral 1 denotes a seat belt apparatus; reference numeral 2 denotes a vehicle seat; reference numeral 3 denotes a seat belt retractor that is a motor retractor; reference numeral 4 denotes a seat belt that is withdrawably retracted by the seat belt retractor 3 and has a belt anchor 4a at one end thereof that is fixed to the floor of the vehicle body or the vehicle seat 2; reference numeral 5 denotes a guide anchor that guides the seat belt 4 withdrawn from the seat belt retractor 3 to the shoulder of an occupant; reference numeral 6 denotes a tongue that is slidably supported by the seat belt 4 guided by the guide anchor 5; reference numeral 7 denotes a buckle that is fixed to the floor of the vehicle body or the vehicle seat and into which the tongue 6 is inserted and releasably engaged; reference numeral 8 denotes an electric motor that is a driving means that rotates the spool of the seat belt retractor 3 and thereby retracts and withdraws the seat belt 4; reference numeral 9 denotes a U-shaped frame; reference numeral 9a denotes the left side wall in FIG. 9 of the frame 9; reference numeral 9b denotes the right side wall in FIG. 9 of the frame 9; reference numeral 10 denotes a spool; reference numeral 10a denotes the rotating shaft of the spool 10; reference numeral 11 denotes a locking mechanism; reference numeral 12 denotes a deceleration sensing mechanism; reference numeral 13 denotes a spring mechanism that urges the spool in the retracting direction; reference numeral 13a denotes a case of the spring mechanism 13; reference numeral 14 denotes a power transmission mechanism, for example, a planetary gear deceleration mechanism or an external gear deceleration mechanism; reference numeral 14a denotes a case of the power transmission mechanism 14; reference numeral 15 denotes a rotation sensor that is a rotation amount detector; reference numeral 16 denotes a controller (CPU); reference numeral 17 denotes a pretensioner; reference numeral 18 denotes a rotating disk of the rotation sensor 15 attached to the rotating shaft 10a of the spool 10 with a bushing 10b rotatably integrally with the rotating shaft 10a and concentrically with the rotating shaft 10a; reference numeral 19 denotes a bracket fixed to the right side wall 9b of the frame 9; reference numerals 20a and 20b denote a pair of first and second Hall elements (first and second Hall ICs), respectively, that are disposed with a predetermined interval therebetween in the circumferential direction of a circle concentric with the rotating shaft 10a, attached to the bracket 19, and electrically connected to the controller 16; reference numeral 21 denotes a ring-shaped magnet of the rotating disk 18 that is concentric with the rotating shaft 10a and in which N-pole magnets 21a and S-pole magnets 21b are arranged alternately; and reference numeral 22 denotes a ring-shaped magnet holding member of the rotating disk 18 that holds the magnet 21 and is attached to the rotating shaft 10a of the spool 10 rotatably integrally with the spool 10 and concentrically with the rotating shaft 10a.

When the spool 10 that is a moving member (rotating member) rotates in the seat belt withdrawing direction, the rotating disk 18, that is, the magnet 21 also rotates in the seat belt withdrawing direction in conjunction with the rotation of the spool 10. The first and second Hall ICs 20a and 20b detect the magnetic poles of the N-pole magnets 21a and the magnetic poles of the S-pole magnets 21b, respectively, and output their detection signals to the controller 16. At this time, the first and second Hall ICs 20a and 20b detect the N-pole magnets 21a and the S-pole magnets 21b alternately. Therefore, the current polarities of the detection signals of the first and second Hall ICs 20a and 20b switch, and the phases of the detection signals of the first and second Hall ICs 20a and 20b differ by a predetermined amount. The controller 16 detects the rotation amount (rotational position) of the spool 10 by counting the number of times of switching of the current polarities of the detection signals from the first and second Hall ICs 20a and 20b. On the basis of the phase difference between the detection signals from the first and second Hall ICs 20a and 20b, the controller 16 determines whether the rotation direction of the spool 10 is the seat belt withdrawing direction or the seat belt retracting direction. On the basis of the rotation amount of the spool 10 and the rotation direction of the spool 10, the controller 16 controls the driving of the electric motor 8 and thereby controls the belt tension of the seat belt 4.

As described above, the rotation sensor 15 that detects the rotation amount of the spool 10 and the rotation direction of the spool 10 serves as a position detector that detects the position and moving direction of a moving member.

In a position detector such as that described above that detects the magnetisms of alternately-arranged N-pole magnets and S-pole magnets using magnetic detecting members such as Hall elements, the magnetization width of the N-pole magnets and the magnetization width of the S-pole magnets are set equal to each other (see, for example, Japanese Unexamined Patent Application Publication No. 2009-113718 and Japanese Unexamined Patent Application Publication No. 2004-264136).

In the meantime, magnetic detecting members such as Hall elements include unipolar detection type magnetic detecting members that detect only the N-pole or S-pole. However, when such unipolar detection type magnetic detecting members are used to detect the N-pole magnets and S-pole magnets that are arranged alternately and have equal magnetization widths and to output the position of the moving member, there are the following problems.

Figures 12A, 12B:
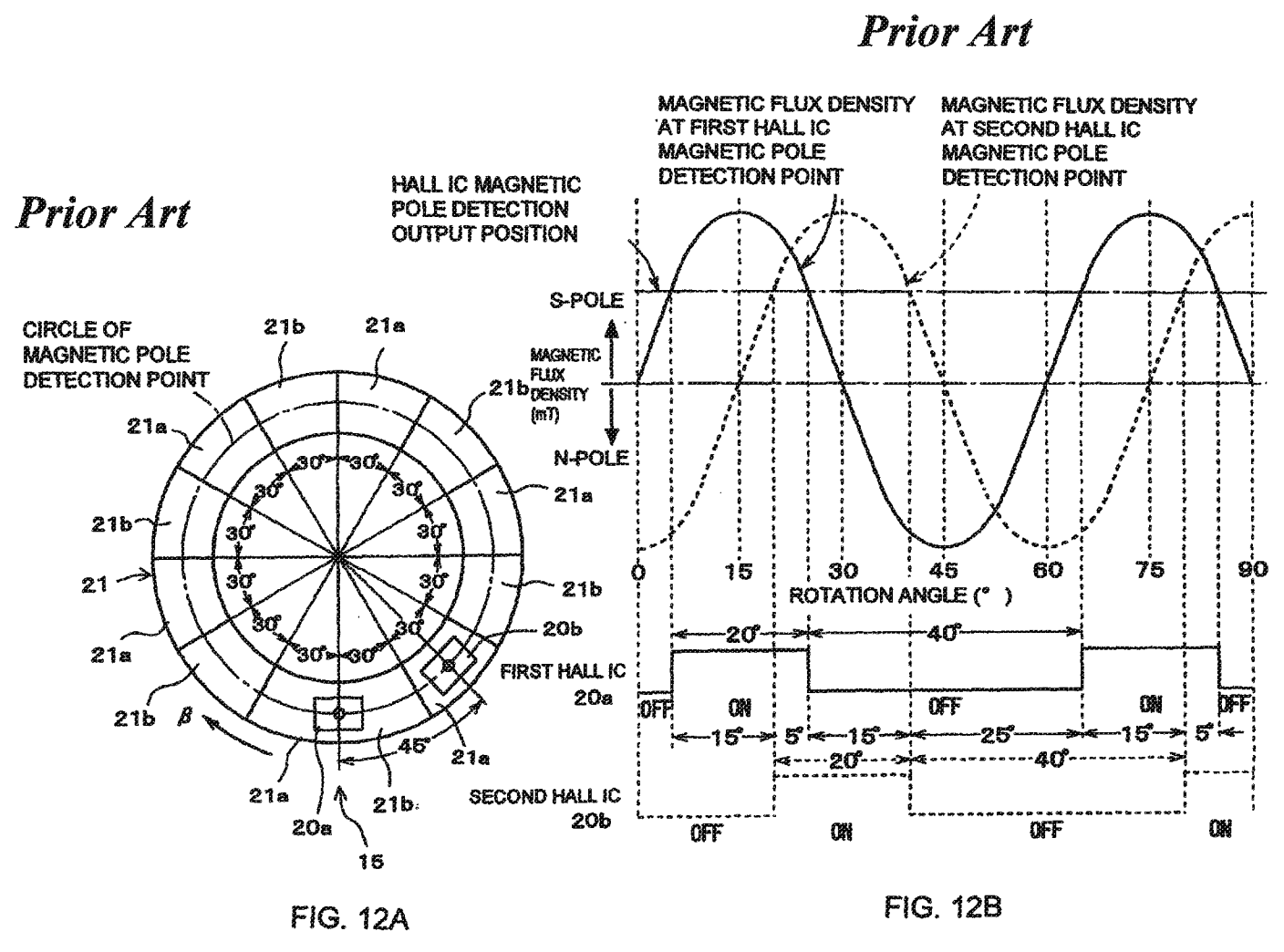

FIGS. 12A and 12B illustrate the problems in the case where unipolar detection type magnetic detecting members are used to detect the N-pole magnets and S-pole magnets that are arranged alternately and have equal magnetization widths. In FIGS. 12A and 12B, the same reference numerals will be used to designate the same components as those shown in FIG. 10.

Suppose that, as shown in FIG. 12A, a rotation sensor 15 has: a rotatable ring-shaped magnet 21 that has six N-pole magnets and six S-pole magnets arranged alternately and having the same magnetization width of 30° in the circumferential direction of the magnet 21; and a pair of first and second Hall ICs 20a and 20B of unipolar detection type detecting only the S-pole and disposed so that their magnetic pole detection points are 45° apart in the circumferential direction of the magnet 21. Suppose that when the rotation angle of the magnet 21 is 0°, the magnet pole detection point (magnetization position) of the first Hall IC 20a is located at the border between an N-pole magnet 21a and an S-pole magnet 21b shown in FIG. 12A. At this time, the magnetic pole detection point (magnetization position) of the second Hall IC 20b is located at the middle position of the magnetization width in the circumferential direction of an N-pole magnet 21a shown in FIG. 2A.

Suppose that the magnet 21 rotates in the β direction (clockwise in FIG. 12A). The magnetic flux density (mT) due to the magnet 21 at the pole detection point of the first Hall IC 20a becomes a sine curve shown by solid line in FIG. 12(b). The magnetic flux density (mT) due to the magnet 21 at the pole detection point of the second Hall IC 20b becomes a sine curve shown by dotted line in FIG. 12(b). The first Hall IC 20a outputs a detection signal (ON) at an S-pole of a magnetic flux density (mT) of a predetermined value or more but does not output a detection signal (OFF) at a magnetic pole other than this. That is, the first Hall IC 20a outputs a detection signal at rotation angles of the magnet 21 between 5° and 25°, and does not output a detection signal at rotation angles of the magnet 21 between 25° and 65°. After that, with the rotation of the magnet 21, the first Hall IC 20a periodically repeats ON and OFF. Similarly, the second Hall IC 20b outputs a detection signal at rotation angles of the magnet 21 between 20° and 40°, and does not output a detection signal at rotation angles of the magnet 21 between 40° and 80°. After that, with the rotation of the magnet 21, the second Hall IC 20b periodically repeats ON and OFF.

As described above, the rotation angle of the magnet 21 at which the first and second Hall ICs 20a and 20b output detection signals is 20°, and the rotation angle of the magnet 21 at which the first and second Hall ICs 20a and 20b do not output detection signals is 40°. Therefore, the range of detection of rotation angle by the first and second Hall ICs 20a and 20b is small, and the range of non-detection of rotation angle by the first and second Hall ICs 20a and 20b is large. For this reason, the rotation angle of the magnet 21 from when the second Hall IC 20b is switched from OFF to ON until when the first Hall IC 20a is switched from ON to OFF is 5°, whereas the rotation angle of the magnet 21 from when the second Hall IC 20b is switched from ON to OFF until when the first Hall IC 20a is switched from OFF to ON is 25°, and these rotation angles are different from each other.

In this type of rotation sensor 15, it is ideal that the ranges of detection and non-detection of rotation angle by the first and second Hall ICs 20a and 20b be equal in order to accurately detect the rotation angle. However, if the ranges of detection and non-detection of rotation angle by the first and second Hall ICs 20a and 20b are different, a variation in detected angle is produced, and it is difficult to detect the rotation angle with a high degree of accuracy.

A variation in rotation angle detected by the rotation sensor 15 is also caused, for example, by variations in the installation positions of the first and second Hall ICs 20a and 20b. For example, as shown in FIG. 13, when the reference angle to be detected by the first and second Hall ICs 20a and 20b is X°, the rotation angle actually detected by the first and second Hall ICs 20a and 20b is X°±α°. Here, X° is the reference angle, and α° is a variation. As a result, the detection accuracy of the rotation sensor 15 decreases. So, in the seat belt retractor 3 described in Japanese Unexamined Patent Application Publication No. 2009-113718, for example, the variations in the installation positions of the first and second Hall ICs 20a and 20b are minimized so that the detection accuracy of the rotation sensor 15 is maintained at least within the range of practical use. However, the variation in the rotation angle detected by the rotation sensor 15 is at almost the same level.

However, in the seat belt retractor 3 described in Japanese Unexamined Patent Application Publication No. 2009-113718, the rotating disk 18 (that is, the magnet 21) of the rotation sensor 15 is provided rotatably integrally with the rotating shaft 10a of the spool 10. That is, the rotation speed of the spool 10 and the rotation speed of the magnet 21 are equal or almost equal. For this reason, the rotation angle of the magnet 21 to be detected is small relative to a predetermined number of times of switching of the current polarities of the detection signals from the first and second Hall elements 20a and 20b. When the rotation angle of the magnet 21 to be detected is small, the variation in the rotation angle detected by the rotation sensor 15 has an influence on the rotation angle of the magnet 21 to be detected. In the seat belt retractor 3 described in Japanese Unexamined Patent Application Publication No. 2009-113718, the detection accuracy of the rotation sensor 15 is enough for practical use, but it is desirable to further improve the detection accuracy of the rotation sensor 15.

On the other hand, a conventional seat belt retractor employing a rotation sensor 15 that shows a variation as described above has room for improvement in controlling the belt tension with a high degree of accuracy by performing the retraction and withdrawal of the seat belt by the spool with a high degree of accuracy. A conventional seat belt apparatus having this conventional seat belt retractor has room for improvement in controlling the belt tension with a high degree of accuracy according to the running state of the vehicle, the usage state of the seat belt apparatus, and the like.

SUMMARY OF THE INVENTION

The present invention is made in view of such circumstances, and an object thereof is to provide a position detector that can detect the position of a moving member with a higher degree of accuracy.

Another object of the present invention is to provide a seat belt retractor that can control the belt tension with a higher degree of accuracy according to the running state of the vehicle, the usage state of the seat belt apparatus, and the like, and a seat belt apparatus having this seat belt retractor.

To solve the above-described problems, a position detector according to the present invention includes a magnetic member in which N-poles and S-poles are arranged alternately and that moves in conjunction with the movement of a moving member, and at least one magnetic detecting member that detects only the N-poles or S-poles of the magnetic member, wherein the position detector detects the position of the moving member by detecting only the N-poles or S-poles of the magnetic member using the at least one magnetic detecting member, and the magnetization width of the N-poles or S-poles of the magnetic member detected by the at least one magnetic detecting member is larger than the magnetization width of the other poles.

In the position detector according to the present invention, the moving member may be a rotating member, the N-poles and S-poles of the magnetic member may be arranged alternately and circularly, and the magnetic member may rotate about the center of the circular arrangement of the N-poles and S-poles in conjunction with the rotation of the rotating member, and the at least one magnetic detecting members may include a first magnetic detecting member and a second magnetic detecting member disposed apart from the first magnetic detecting member in the circumferential direction of the circular arrangement of the N-poles and S-poles.

In the position detector according to the present invention, the magnetic member may include a predetermined number of magnets that are the N-pole magnets and S-pole magnets arranged alternately and circularly, and the at least one magnetic detecting member may be at least one Hall element that detects only the N-poles of the N-pole magnets or the S-poles of the S-pole magnets.

A seat belt retractor according to the present invention includes at least a spool that retracts a seat belt, a driving means for rotating this spool, and a rotation amount detector that detects the rotation amount of the spool, wherein the rotation amount of the spool is controlled by controlling the driving of the driving means on the basis of the rotation amount of the spool detected by the rotation amount detector. The rotation amount detector is the above-described position detector of the present invention, and the moving member is the spool. The rotation amount detector has a rotating disk, the rotating disk has the predetermined number of magnets arranged concentrically with the rotating disk, and a driven member that is rotatable integrally with the predetermined number of magnets. The seat belt retractor has a driving member provided rotatably integrally with the spool and transmitting the rotation of the spool to the driven member. The seat belt retractor has a speed increasing mechanism that increases the rotation speed of the driving member and transmits to the driven member, and accelerates the rotation of the spool and rotates the magnets. The seat belt retractor has a magnetic detecting member that detects, of the predetermined number of magnets, a magnet located at a predetermined position.

In the seat belt retractor according to the present invention, the rotation amount detector may be disposed eccentrically relative to the rotating shaft of the spool and in the radial direction of the rotating shaft, the driven member may be a driven gear, and the driving member may be a driving gear meshing with the driven gear, and the speed increasing mechanism may include the driven gear and the driving gear.

In the seat belt retractor according to the present invention, the rotation amount detector may be disposed eccentrically relative to the rotating shaft of the spool and in the radial direction of the rotating shaft, the driven member may be a driven pulley, and the driving member may be a driving pulley, and the speed increasing mechanism may include the driven pulley, the driving pulley, and an endless belt looped over the driven pulley and the driving pulley.

In the seat belt retractor according to the present invention, the rotation amount detector may be disposed concentrically with the rotating shaft of the spool, and the speed increasing mechanism may be a planetary gear mechanism.

In the seat belt retractor according to the present invention, the driven member may be a sun gear of the planetary gear mechanism, and the driving member may be a carrier of the planetary gear mechanism.

A seat belt apparatus according to the present invention includes at least a seat belt retractor that retracts a seat belt, a tongue that is slidably supported by the seat belt withdrawn from this seat belt retractor, and a buckle with which the tongue is releasably engaged, wherein the seat belt apparatus restrains an occupant with the seat belt, and the seat belt retractor is any one of the above-described seat belt retractors of the present invention.

A position detector of the present invention configured as above includes a magnetic member in which N-poles and S-poles are arranged alternately and that moves in conjunction with the movement of a moving member, and at least one unipolar detection type magnetic detecting member that detects only the N-poles or S-poles of the magnetic member. In that case, the magnetization width of the N-poles or S-poles of the magnetic member detected by the at least one magnetic detecting member is set larger than the magnetization width of the other poles. Therefore, the variation in the detection point itself of the magnetic detecting member can be reduced, and the detection point of the magnetic detecting member can be brought close to the ideal detection point. Thus, the position detector of the present invention can detect the position of the magnetic member with a higher degree of accuracy.

When a pair of first and second magnetic detecting members are disposed apart from each other in the moving direction of the magnetic member, the variations in the detection points themselves of the first and second magnetic detecting members can be reduced, and in addition, the variation between the detection points of the first and second magnetic detecting members can be reduced. Therefore, the position detector of the present invention can detect both the position of the magnetic member and the rotation direction of the magnetic member with a higher degree of accuracy.

In the seat belt retractor of the present invention, a speed increasing mechanism that accelerates the rotation of the spool at a predetermined ratio and rotates the magnet is disposed between the rotation amount detector and the spool. Since this speed increasing mechanism makes the rotation speed of the magnet larger than the rotation speed of the spool, the reference angle to be detected by the rotation amount detector can be made larger than the reference angle to be detected by the conventional rotation sensor. Thus, the variation in detection of the rotation amount detector can be effectively reduced. As a result, the detection accuracy of the rotation amount detector can be improved more effectively.

In particular, in the seat belt retractor of the present invention, the employment of the position detector of the present invention, coupled with the above-described effect due to the position detector of the present invention, synergistically and more effectively improves the accuracy of detection of rotational position and rotation direction of the spool performed by the rotation amount detector.

In addition, the rotation amount detector is disposed at a position eccentric relative to the rotating shaft of the spool and in a radial direction of the rotating shaft. Therefore, the rotation amount detector does not function as a bearing of the spool like a conventional one. Thus, a large load applied from the seat belt to the spool in an emergency can be effectively prevented from being transmitted to the rotation amount detector. As a result, the size in the thrust direction (the axial direction of the spool) of the rotation amount detector can be made small compared to a conventional one.

When the speed increasing mechanism is a planetary gear mechanism, the magnet of the rotating disk in the rotation amount detector is disposed concentrically with the rotating shaft of the spool. Therefore, the size of the rotation amount detector can be prevented from increasing in the radial direction of the rotating shaft. In addition, since the speed increasing mechanism disposed between the rotating shaft of the spool and the rotating disk of the rotation amount detector is a planetary gear mechanism, the rotation amount detector can be formed more compactly in the radial direction of the rotating shaft of the spool.

Since a seat belt apparatus of the present invention has the seat belt retractor of the present invention, the belt tension of the seat belt can be controlled more accurately. Therefore, an occupant can be efficiently restrained by the seat belt over a long period and according to the running state of the vehicle and the usage state of the seat belt apparatus.

BRIEF DESCRIPTION OF THE DRAWINGS

FIG. 1 partly shows a first example of an embodiment according to the present invention.

FIG. 2A shows the positional relationship between N-pole magnets, S-pole magnets 21b, and first and second Hall elements. FIG. 2B shows the magnetic flux densities and detection signals at the pole detection points of the first and second Hall elements.

FIGS. 6A and 6B are diagrams comparable to FIGS. 1A and 1B showing a third example of an embodiment of the present invention.

FIG. 12A shows the positional relationship between N-pole magnets, S-pole magnets, and first and second Hall elements of a conventional position detector. FIG. 12B shows the magnetic flux densities and detection signals at the pole detection points of the first and second Hall elements of the conventional position detector.

DETAILED DESCRIPTION OF THE PREFERRED EMBODIMENTS

The embodiments of the present invention will be described with reference to the drawings.

Figure 1A:
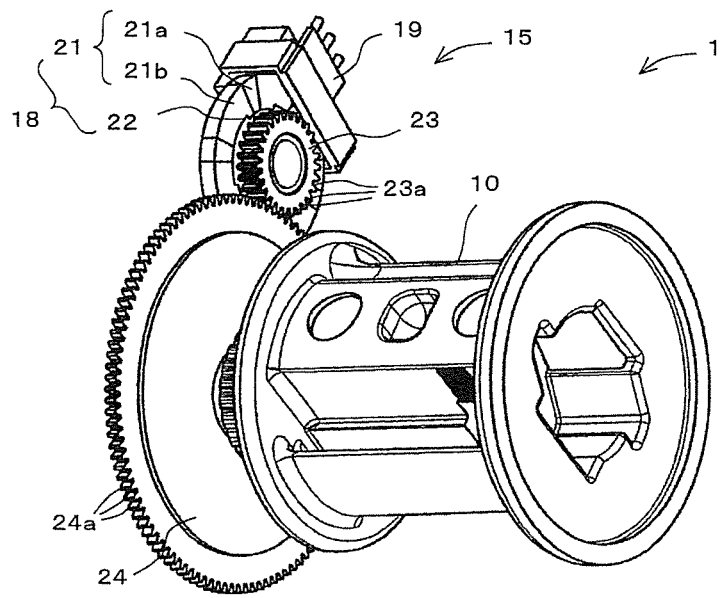
FIG. 1A is a perspective view.

FIG. 1 partly shows a first example of an embodiment according to the present invention, FIG. 1A is a perspective view, and (b) is a right side view in FIG. 1A. In the description of the seat belt retractor and seat belt apparatus of this first example, the same reference numerals will be used to designate the same components as those of the seat belt retractor and seat belt apparatus described in Japanese Unexamined Patent Application Publication No. 2009-113718 shown in FIGS. 8 to 13, and the detailed description thereof will be omitted.

Figure 1B:
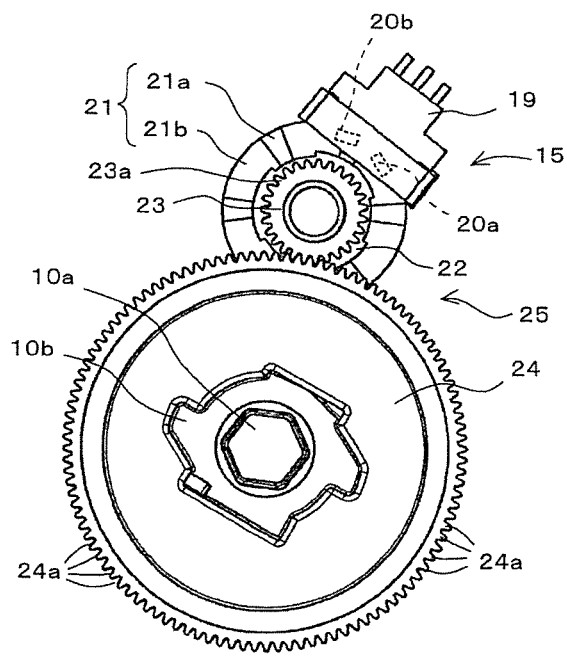
FIG. 1B is a right side view in FIG. 1A.

As shown in FIGS. 1A and 1B, the seat belt retractor 3 used in the seat belt apparatus of the first example has a rotation sensor 15 that is a position detector and a rotation amount detector disposed eccentrically relative to the rotating shaft 10a of the spool 10. This rotation sensor 15 has a rotating disk 18 rotatably attached to the right side wall 9b of the frame and a bracket 19 immovably attached to the right side wall 9b of the frame.

The rotating disk 18 has a ring-shaped magnet holding member 22, and a ring-shaped magnet 21 held by the magnet holding member 22 rotatably integrally therewith. As shown in FIG. 2A, the ring-shaped magnet 21 is formed by alternately arranging N-pole magnets 21a and S-pole magnets 21b. In that case, the magnetization width of the N-pole magnets 21a is set to 15° in the circumferential direction of the magnet 21, and the magnetization width of the S-pole magnets 21b is set to 45° in the circumferential direction of the magnet 21. Therefore, the magnetization width of the S-pole magnets 21b is considerably larger than the magnetization width of the N-pole magnets 21a. The magnet holding member 22 integrally has a cylindrical driven gear 23 (corresponding to a driven member) that is disposed concentrically with the magnet holding member 22 and has external teeth 23a.

A driving gear 24 (corresponding to a driving member) is attached to the rotating shaft 10a of the spool 10 with a bushing 10b rotatably integrally with the rotating shaft 10a and concentrically therewith. This driving gear 24 has external teeth 24a, which mesh with the external teeth 23a of the driven gear 23.

As shown in FIG. 1B, a pair of first and second Hall elements (Hall ICs) 20a and 20b that are magnetic detecting members are attached to the bracket 19 so as to face a part of the magnet 21 as in Japanese Unexamined Patent Application Publication No. 2009-113718. These first and second Hall elements 20a and 20b of the first example are unipolar detection type magnetic detecting members that detect only the S-pole. As shown in FIG. 2A, the first and second Hall ICs 20a and 20b are disposed so that the positions of their magnetic pole detection points are 45° apart in the circumferential direction of the magnet 21. When the rotation angle of the magnet 21 is 0°, the magnetic pole detection point (magnetization position) of the first Hall IC 20a is set at the border between an N-pole magnet 21a and an S-pole magnet 21b shown in FIG. 2A. At this time, the magnetic pole detection point (magnetization position) of the second Hall IC 20b is located at the border between the S-pole magnet 21b and an N-pole magnet 21a shown in FIG. 2A.

Figure 3:
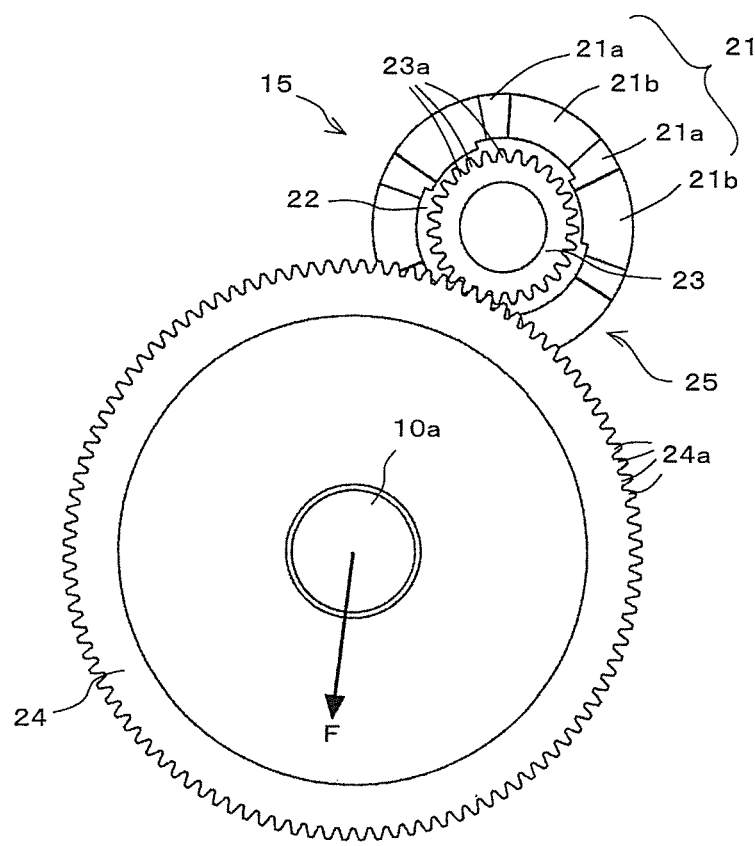
FIG. 3 illustrates the relationship between the direction of a load applied to a spool and the installation position of a rotation sensor.

In this way, in the seat belt retractor 3 of this first example, the rotation sensor 15 is disposed in the radial direction of the driving gear 24 (that is, the radial direction of the rotating shaft 10a). In that case, as shown in FIG. 3, the meshing position between the external teeth 23a of the rotation sensor 15 and the external teeth 24a of the driving gear 24 is disposed at such a position that when a large load F is applied from the seat belt 4 to the spool 10 in the above emergency, this load F moves the driving gear 24 (that is, the rotating shaft 10a) away from the driven gear 23 (that is, the rotation sensor 15).

In the seat belt retractor 3 of the first example, the gear ratio between the external teeth 23a of the driven gear 23 of the rotation sensor 15 and the external teeth 24a of the driving gear 24 is set so that the rotation of the driven gear 23 (that is, the rotation of the magnet 21) is faster than the rotation of the driving gear 24 (that is, the rotation of the spool 10). That is, the driven gear 23 and the driving gear 24 form a speed increasing mechanism 25 that is a gear mechanism that accelerates the rotation of the spool 10 at a predetermined ratio and rotates the magnet 21. Therefore, this speed increasing mechanism 25 is disposed between the rotation sensor 15 and the rotating shaft 10a of the spool 10.

Figure 4A:
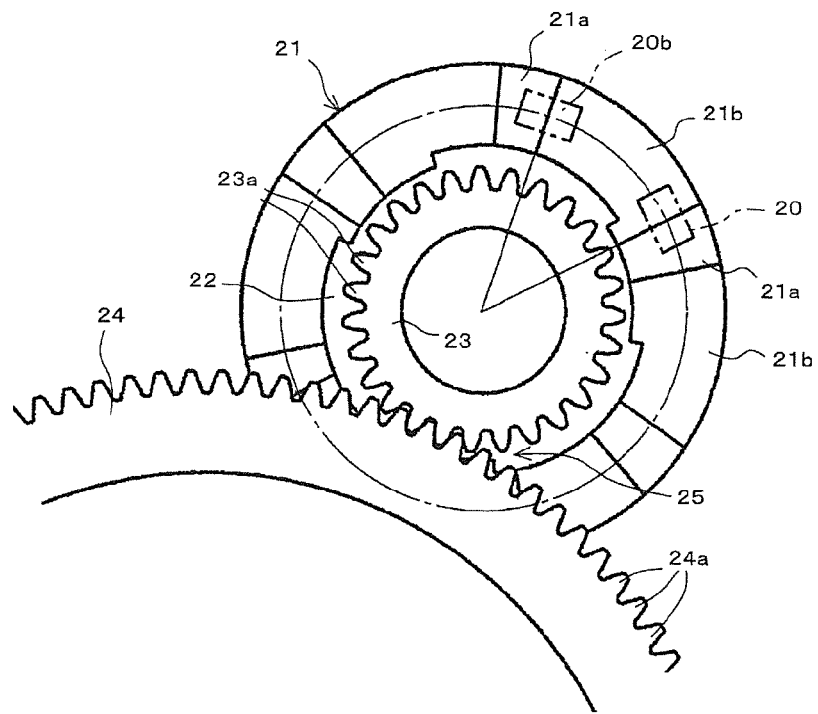
FIG. 4A shows a speed increasing mechanism.
Figure 4B:
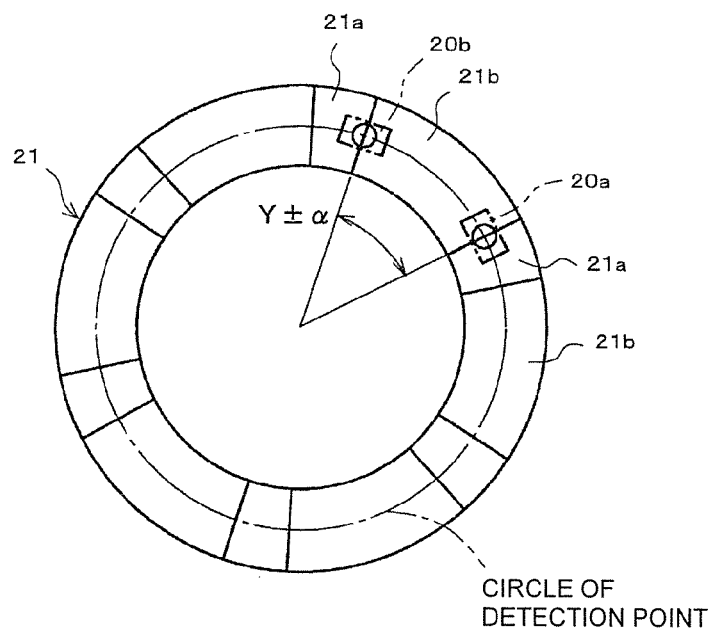
FIG. 4B illustrates the variation in the detection angle of the rotation sensor of the first example shown in FIG. 1.

When the rotation speed of the magnet 21 is made higher than the rotation speed of the spool 10 by the speed increasing mechanism 25, the rotation angle of the magnet 21 to be detected becomes large relative to a predetermined number of times of switching of the current polarities of the detection signals from the first and second Hall elements 20a and 20b. Let a comparison be made between the rotation sensor 15 in the seat belt retractor 3 of the first example shown in FIG. 4B and the rotation sensor 15 in the conventional seat belt retractor 3 shown in FIG. 13. In that case, suppose that the internal and external diameters of the magnet 21 of the rotation sensor 15 of the first example are equal to the internal and external diameters of the magnet 21 of the conventional rotation sensor 15, and the diameters of the circles of detection point detected by the first and second Hall elements 20a and 20b are the same. When the numbers of times of switching of the current polarities of the detection signals from the first and second elements 20a and 20b are the same predetermined number of times of switching, the reference angle (that is, the reference angle to be detected) is denoted by Y° in the rotation sensor 15 of the first example, and by X° in the conventional rotation sensor 15. Therefore, the rotation angle detected by the rotation sensor 15 of this first example is Y°±α°, and the rotation angle detected by the conventional rotation sensor 15 is X°±α°. At this time, the rotation speed of the rotation sensor 15 of the first example has been increased by the speed increasing mechanism 25 and is larger than the rotation speed of the spool 10, and therefore the reference angle Y° of the rotation sensor 15 of the first example is larger than the reference angle X° of the conventional rotation sensor 15 (that is, Y°>X°).

Since Y°>X°, the influence of the variation α° on the reference angle Y° of the rotation sensor 15 of the first example is smaller than the influence of the variation α° on the reference angle X° of the conventional rotation sensor 15. As a specific example, suppose that the rotation speed of the spool 10 is V°/sec and the speed increase ratio of the speed increasing mechanism 25 is 2. In this case, the rotation speed of the magnet 21 of the rotation sensor 15 of this first example is twice the rotation speed V°/sec of the spool 10, that is, 2V°/sec. On the other hand, the rotation speed of the magnet 21 of the conventional rotation sensor 15 is V°/sec, the same as that of the spool 10. Therefore, the variation per unit reference angle in the rotation sensor 15 of the first example is (1.05/2V)°, and that in the conventional rotation sensor 15 is (1.05/V)°. That is, since the influence of variation on the detection angle of the rotation sensor 15 of the first example is (1.05/2V)°/(1.05/V)°, the influence of variation on the reference angle to be detected in the detection angle by the rotation sensor 15 of the first example is a half of the influence of variation on the reference angle to be detected in the detection angle by the conventional rotation sensor 15. That is, at the same detection angle, the variation of the rotation sensor 15 of the first example is 0.525°, and the variation of the conventional rotation sensor 15 is 1.05°.

In addition, as shown in FIG. 2B, when the spool 10 rotates in the seat belt withdrawing direction, the magnet 21 rotates in the β direction (clockwise in FIG. 2A). Since the magnetization width of the S-pole magnets 21b is large and the magnetization width of the N-pole magnets 21b is small, the magnetic flux density (mT) due to the magnet 21 at the magnetic pole detection point of the first Hall IC 20a becomes an anomalous sine curve shown by solid line in FIG. 2B in which the center position in the amplitude direction is shifted to the N-pole side, the peaks on the S-pole side are wide in the rotation angle direction; and the peaks on the N-pole side are narrow in the rotation angle direction. The magnetic flux density (mT) due to the magnet 21 at the magnetic pole detection point of the second Hall IC 20b becomes an anomalous sine curve shown by dotted line in FIG. 2B that is equal in waveform to the first Hall IC 20a but different in phase.

The first Hall IC 20a outputs a detection signal (ON) at an S-pole of a magnetic flux density (mT) of a predetermined value or more but does not output a detection signal (OFF) at a magnetic pole other than this. That is, the first Hall IC 20a does not output a detection signal at rotation angles of the magnet 21 between 0° and 7.5°. The first Hall IC 20a outputs a detection signal at rotation angles of the magnet 21 between 7.5° and 37.5°, and does not output a detection signal at rotation angles of the magnet 21 between 37.5° and 67.5°. After that, with the rotation of the magnet 21, the first Hall IC 20a periodically repeats ON and OFF. Similarly, the second Hall IC 20b does not output a detection signal at rotation angles of the magnet 21 between 0° and 22.5°. The second Hall IC 20b outputs a detection signal at rotation angles of the magnet 21 between 22.5° and 52.5°, and does not output a detection signal at rotation angles of the magnet 21 between 52.5° and 82.5°. After that, with the rotation of the magnet 21, the second Hall IC 20b periodically repeats ON and OFF.

In the rotation sensor 15 of this example, the rotation angles of the magnet 21 at which the first and second Hall ICs 20a and 20b output detection signals are both 30°, and the rotation angles of the magnet 21 at which the first and second Hall ICs 20a and 20b do not output detection signals are also 30°. Therefore, the ranges of detection and non-detection of rotation angle by the first and second Hall ICs 20a and 20b are equal. Therefore, the rotation angle of the magnet 21 from when the first Hall IC 20a is switched from OFF to ON until when the second Hall IC 20b is switched from OFF to ON is 15°. The rotation angle of the magnet 21 from when the second Hall IC 20b is switched from OFF to ON until when the first Hall IC 20a is switched from ON to OFF is also 15°. Further, the rotation angle of the magnet 21 from when the second Hall IC 20b is switched from ON to OFF until when the first Hall IC 20a is switched from OFF to ON is also 15°.

As described above, the rotation angle of ON and the rotation angle of OFF of the first and second Hall ICs 20a and 20b are both 30°, and the rotation angles between the switches between ON and OFF of the first and second Hall ICs 20a and 20b are all 15°. Therefore, in the rotation sensor 15 of this example, the detection angles of the first and second Hall ICs 20a and 20b are close to the ideal detection angles, and there is almost no variation in each detection angle. Thus, the rotation sensor 15 of this example detects the rotation angle of the magnet 21 (that is, the rotation angle of the spool 10) with a high degree of accuracy.

The other configurations of the rotation sensor 15, the seat belt retractor 3, and the seat belt apparatus 1 of this first example are the same as those of the rotation sensor 15, the seat belt retractor 3, and the seat belt apparatus 1 described in Japanese Unexamined Patent Application Publication No. 2009-113718.

The rotation sensor 15 of the first example configured as above includes first and second Hall ICs 20a and 20b of unipolar detection type that detect only the S-pole, and a magnet 21 in which N-pole magnets 21a and S-pole magnets 21b are arranged alternately, and detects only the S-poles of the S-pole magnets 21b using the first and second Hall ICs 20a and 20b. In that case, the magnetization width of the S-pole magnets 21b is set larger than the magnetization width of the N-pole magnets 21a. Therefore, the variations in the detection angles themselves of the first and second Hall ICs 20a and 20b can be reduced, and in addition, the variation between the detection angles of the first and second Hall ICs 20a and 20b can be reduced. Thus, the detection angles of the first and second Hall ICs 20a and 20b can be brought close to the ideal detection angles. Therefore, the rotation sensor 15 of this example can detect both the rotation angle of the magnet 21 (that is, the rotation angle of the spool 10, that is, the rotational position of the spool 10) and the rotation direction of the magnet 21 with a higher degree of accuracy.

A seat belt retractor 3 employing this rotation sensor 15 and a seat belt apparatus having this seat belt retractor 3 can control the belt tension of the seat belt 4 with a higher degree of accuracy according to the running state of the vehicle and the usage state of the seat belt apparatus 1. Therefore, an occupant can be efficiently restrained by the seat belt 4 over a long period and according to the running state of the vehicle and the usage state of the seat belt apparatus 1.

In addition, between the rotation sensor 15 and the rotating shaft 10a of the spool 10, a speed increasing mechanism 25 is disposed that accelerates the rotation of the spool 10 at a predetermined ratio and transmits the accelerated rotation to the magnet 21. Since this speed increasing mechanism 25 makes the rotation speed of the magnet 21 higher than the rotation speed of the spool 10, the reference angle Y° to be detected by the rotation sensor 15 of this first example can be made larger than the reference angle X° to be detected by the conventional rotation sensor 15. Thus, the variation in detection of the rotation sensor 15 of this first example can be effectively reduced.

The seat belt retractor 3 of this first example employs the rotation sensor 15 of the first example that is a position detector of the present invention. The employment of the rotation sensor 15 of the first example, coupled with the effect of variation reduction due to this speed increasing mechanism 25, synergistically and more effectively improves the accuracy of detection of rotational position and rotation direction of the spool 10 performed by the rotation sensor 15.

The rotation sensor 15 is disposed at a position in a radial direction eccentric relative to the rotating shaft 10a of the spool 10 and in such a direction that a large load F applied to the spool 10 in an emergency moves the driving gear 24 away from the driven gear 23. Therefore, the rotation sensor 15 does not function as a bearing of the spool 10 like a conventional one. Thus, a large load F applied from the seat belt 4 to the spool 10 in an emergency can be effectively prevented from being transmitted to the rotation sensor 15. As a result, the size in the thrust direction (the axial direction of the spool 10) of the rotation sensor 15 can be made small compared to a conventional one. Since the seat belt retractor 3 of the first example has this rotation sensor 15, the increase in the size in the thrust direction of the seat belt retractor 3 can be effectively prevented even if the rotation sensor 15 is provided. In particular, since the rotation sensor 15 is disposed in a radial direction eccentrically relative to the rotating shaft 10a of the spool 10, the increase in the size in the thrust direction of the seat belt retractor 3 can be effectively prevented.

In addition, since the above-described large load F is prevented from being transmitted to the rotation sensor 15, the rotation sensor 15 can be prevented from being influenced by this load F. Thus, the detection accuracy of the rotation sensor 15 can be improved.

When a large deceleration acts on the vehicle in an emergency, the inertial force of an occupant applied to the seat belt 4 is nearly forward, and therefore the load direction F is nearly constant. Therefore, the installation position of the rotation sensor 15 can be easily set.

Thus, it is possible to provide such a seat belt retractor that the detection accuracy of the rotation sensor 15 can be improved, the load applied to the rotation sensor 15 can be reduced, and the increase in the size in the thrust direction can be prevented.

The other advantageous effects of the rotation sensor 15, the seat belt retractor 3, and the seat belt apparatus 1 of this first example are the same as those of the rotation sensor 15, the seat belt retractor 3, and the seat belt apparatus 1 described in Japanese Unexamined Patent Application Publication No. 2009-113718.

Figure 5:
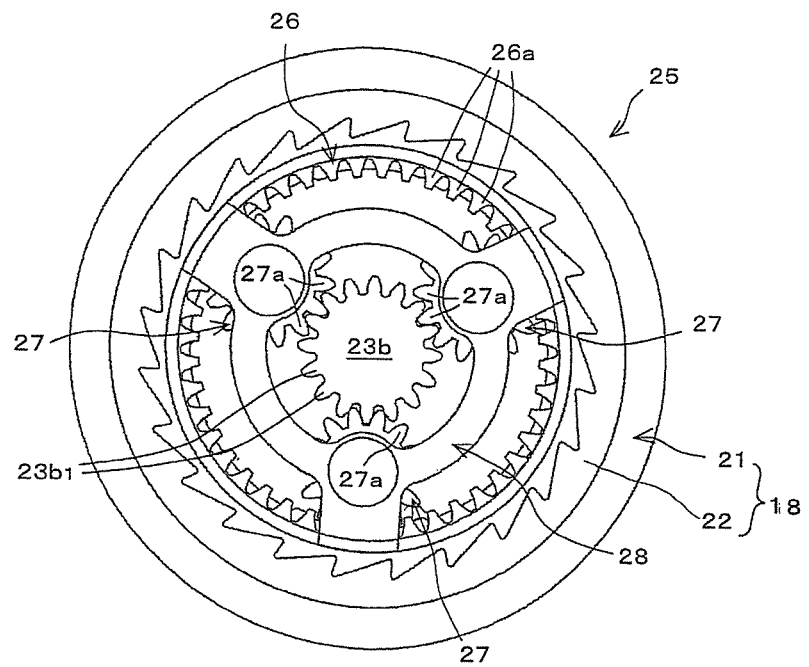
FIG. 5 is a diagram comparable to FIG. 3 showing a second example of an embodiment of the present invention.

FIG. 5 is a diagram comparable to FIG. 3 showing a second example of an embodiment of the present invention.

In the first example shown in FIGS. 1 to 4A and 4B, the rotating disk 18 of the rotation sensor 15 is disposed eccentrically relative to the rotating shaft 10a of the spool 10. However, as shown in FIG. 5, in a seat belt retractor 3 of this second example, as in the above-described Japanese Unexamined Patent Application Publication No. 2009-113718, the rotating disk 18 is disposed concentrically with the rotating shaft 10a of the spool 10.

In the seat belt retractor 3 of the second example, the speed increasing mechanism 25 is a planetary gear mechanism. That is, the driven gear 23 provided in the rotating disk 18 of the rotation sensor 15 is a sun gear 23b having external teeth 23b1. This sun gear 23b can rotate integrally with the rotating disk 18 (that is, the magnet 21) and is disposed concentrically with the rotating shaft 10a. In addition, an internal gear 26 having internal teeth 26a is disposed concentrically with the rotating shaft 10a and is fixed to the right side wall 9b of the frame 9. Furthermore, planet gears 27 are disposed that have external teeth 27a meshing with the external teeth 23b1 of the sun gear 23b and the internal teeth 26a of the internal gear 26. The number of the planet gears 27 is predetermined (three in the shown example), and the planet gears 27 are disposed at regular intervals in the circumferential direction. Each planet gear 27 is rotatably supported by a carrier 28. This carrier 28 is attached to the rotating shaft 10a rotatably integrally therewith. Therefore, the carrier 28 is rotatable integrally with the spool 10.

The other configurations of the seat belt retractor 3 and the seat belt apparatus 1 of this second example are the same as those of the above-described first example.

In the seat belt retractor 3 of this second example configured as above, the rotation of the spool 10 is transmitted through the rotating shaft 10a and rotates the carrier 28. The three planet gears 27 rotate, and therefore the sun gear 23b rotates. At this time, the planetary gear mechanism accelerates the rotation of the carrier 28 at a predetermined ratio, and the sun gear 23b rotates. That is, the rotation of the spool 10 is accelerated by the speed increasing mechanism 25 and transmitted to the rotating disk 18, and the rotation speed of the magnet 21 becomes larger than the rotation speed of the spool 10.

In the seat belt retractor 3 of this second example, the magnet 21 of the ring-shaped rotating disk 18 in the rotation sensor 15 is disposed concentrically with the rotating shaft 10a of the spool 10. Therefore, the size of the rotation sensor 15 can be prevented from increasing in the radial direction of the rotating shaft 10a. In addition, since the speed increasing mechanism 25 disposed between the rotating shaft 10a of the spool 10 and the rotating disk 18 of the rotation sensor 15 is a planetary gear mechanism, the rotation sensor 15 can be formed more compactly in the radial direction of the rotating shaft 10a.

The other advantageous effects of the seat belt retractor 3 and the seat belt apparatus 1 of this second example are substantially the same as those of the above-described first example.

FIGS. 6A and 6B are diagrams comparable to FIGS. 1A and 1B showing a third example of an embodiment of the present invention.

In the first example shown in FIGS. 1 to 4A and 4B, the speed increasing mechanism 25 is a gear mechanism including a driven gear 23 of the rotation sensor 15 and a driving gear 24 fixed to the rotating shaft 10a of the spool 10. However, as shown in FIGS. 6A and 6B, in a seat belt retractor 3 of this third example, the speed increasing mechanism 25 is a belt transmission mechanism 29. That is, in this third example, a driven pulley 30 is attached to the magnet holding member 22 of the rotation sensor 15 as a substitute for the driven gear 23 of the first example in the same manner as the driven gear 23. A driving pulley 31 is attached to the rotating shaft 10a of the spool 10 as a substitute for the driving gear 24 of the first example in the same manner as the driving gear 24. An endless belt 32 is looped over the driven pulley 30 and the driving pulley 31. That is, the belt transmission mechanism 29 includes a driven pulley 30, a driving pulley 31, and an endless belt 32. The endless belt looping radius of the driving pulley 31 is set larger than the endless belt looping radius of the driven pulley 30. Therefore, the rotation of the spool 10 is accelerated and transmitted to the magnet 21, and the rotation speed of the magnet 21 is larger than the rotation speed of the spool 10.

The other configurations and advantageous effects of the seat belt retractor 3 and the seat belt apparatus 1 of this third example are substantially the same as those of the above-described first example.

Figure 7:
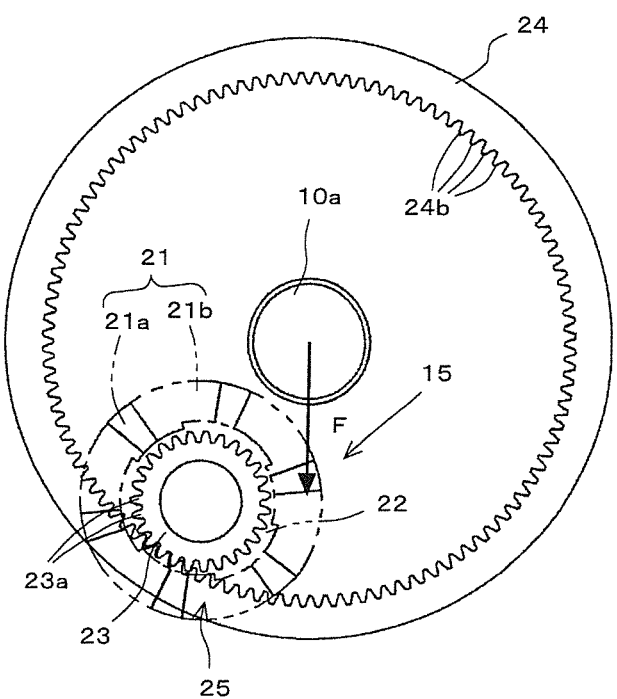
FIG. 7 is a diagram comparable to FIG. 3 showing a fourth example of an embodiment of the present invention.
Figure 8:
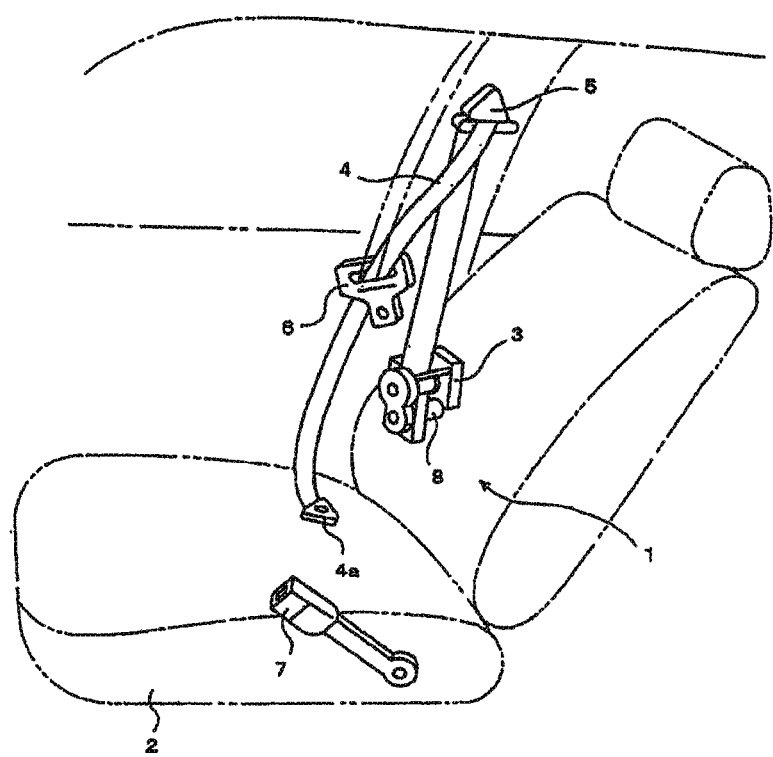
FIG. 8 shows a seat belt apparatus described in Japanese Unexamined Patent Application Publication No. 2009-113718.
Figure 9:
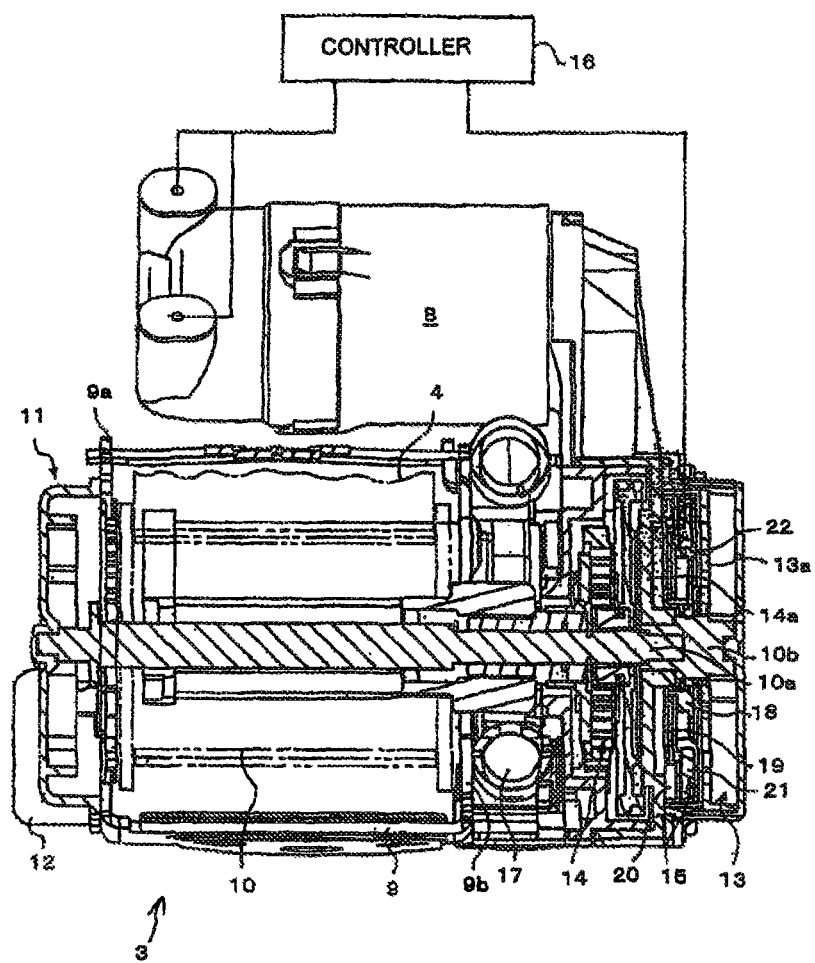
FIG. 9 is a partial sectional view of a seat belt retractor described in Japanese Unexamined Patent Application Publication No. 2009-113718.
Figure 10A:
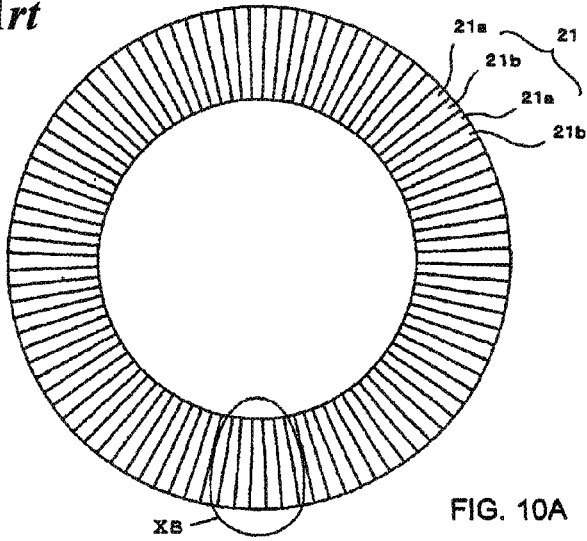
FIG. 10A shows a ring-shaped magnet of a rotation sensor described in Japanese Unexamined Patent Application Publication No. 2009-113718.
Figure 10C:
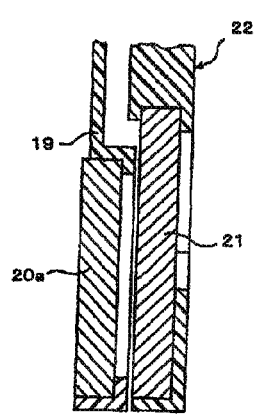
FIG. 10C is a sectional view taken along line XC-XC in FIG. 10B.
Figure 10B:
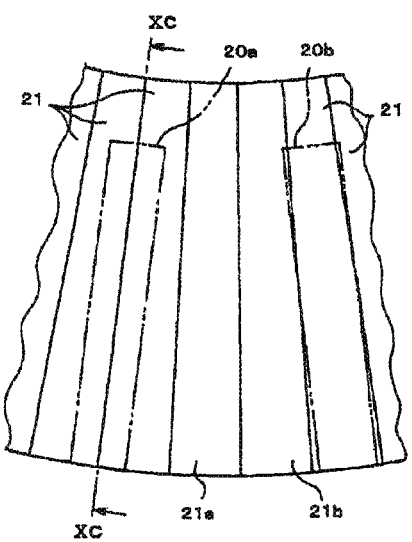
FIG. 10B is a partial view of the rotation sensor described in Japanese Unexamined Patent Application Publication No. 2009-113718, corresponding to part XB in FIG. 10A.
Figure 11:
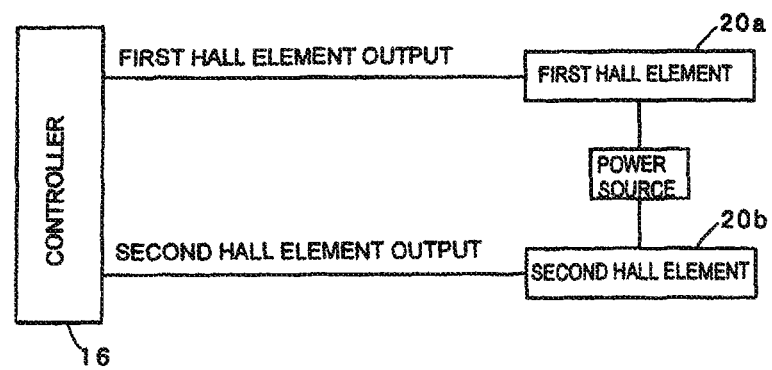
FIG. 11 illustrates the detection of rotation by the rotation sensor.
Figure 13:
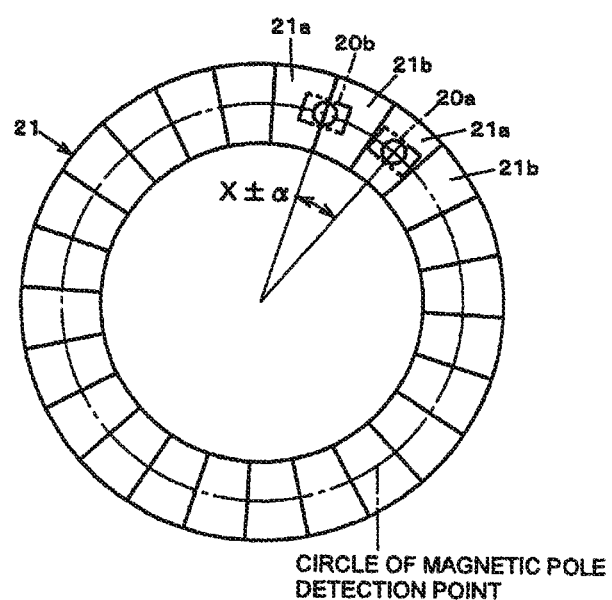
FIG. 13 illustrates the variation in the detection angle of a rotation sensor described in Japanese Unexamined Patent Application Publication No. 2009-113718.

FIG. 7 is a diagram comparable to FIG. 3 showing a fourth example of an embodiment of the present invention.

In the first example shown in FIGS. 1 and 3, the driving gear 24 has external teeth 24a, and the external teeth 23a of the driven gear 23 of the rotation sensor 15 are meshed with the external teeth 24a of the driving gear 24. However, as shown in FIG. 7, in a seat belt retractor 3 of this fourth example, the driving gear 24 is an internal gear having internal teeth 24b. The external teeth 23a of the driven gear 23 are meshed with the internal teeth 24b of the driving gear 24. In that case, as in the above-described first example, the rotation sensor 15 is disposed at a position in a radial direction eccentric relative to the rotating shaft 10a of the spool 10 and in such a direction that a large load F applied to the spool 10 in an emergency moves the driving gear 24 away from the driven gear 23.

The other configurations and advantageous effects of the seat belt retractor 3 of this fourth example are substantially the same as those of the first example shown in FIGS. 1 and 3.

The present invention is not limited to the above-described examples. For example, the magnetic detecting members that are first and second Hall ICs 20a and 20b may be unipolar detection type magnetic detecting members that detect only the N-pole. Various design changes may be made within the technical scope described in the claims.

The position detector, seat belt retractor, and seat belt apparatus of the present invention are suitable as: a position detector including a unipolar detection type magnetic detecting member such as a Hall element that detects only the N-pole or S-pole, and a magnetic member in which N-poles and S-poles are arranged alternately and that moves in conjunction with the movement of a moving member (the term "moving member" includes a rotating member), wherein the position detector detects the position of the moving member by detecting only the N-poles or S-poles of the magnetic member using the magnetic detecting member; a seat belt retractor that detects the rotation amount of a spool using this position detector and thereby controls the rotation of the spool; and a seat belt apparatus having this seat belt retractor.

What is claimed is:

1. A position detector comprising:
a magnetic member in which N-pole magnets and S-pole magnets are arranged alternately and that moves in conjunction with the movement of a moving member, each of the N-pole magnets having a predetermined magnetization width, and each of the S-pole magnets having a predetermined magnetization width; and
at least one magnetic detecting member that detects only the N-pole magnets or S-pole magnets of the magnetic member at a magnetic pole detection point,
wherein the position detector detects the position of the moving member by detecting only the N-pole magnets or the S-pole magnets of the magnetic member using the at least one magnetic detecting member, and
the predetermined magnetization widths of either all of the N-pole magnets or all of the S-pole magnets of the magnetic member at the magnetic pole detection point for being detected by the at least one magnetic detecting member is larger than the predetermined magnetization widths of all of the other of the N-pole magnets and the S-pole magnets at the magnetic pole detection point,
the magnetic member is a rotatable, ring-shaped magnetic member with the N-pole magnets and the S-pole magnets arranged alternatively around the ring-shaped magnetic member, and all of the ranges of detection of rotation angle in which the magnetic detecting member detects only one of the N-pole magnets and the S-pole magnets of the magnetic member and outputs a detection signal, and all of the ranges of non-detection of rotation angle in which the magnetic detecting member does not detect any one of the N-pole magnets and the S-pole magnets of the magnetic member and does not output the detection signal, are set to be equal.

2. The position detector according to claim 1,
wherein the moving member is a rotating member,
the N-pole magnets and S-pole magnets of the magnetic member are arranged alternately and circularly, and the magnetic member rotates about the center of the circular arrangement of the N-pole magnets and S-pole magnets in conjunction with the rotation of the rotating member, and
the at least one magnetic detecting members comprises a first magnetic detecting member and a second magnetic detecting member disposed apart from the first magnetic detecting member in the circumferential direction of the circular arrangement of the N-pole magnets and S-pole magnets.

3. The position detector according to claim 1,
wherein the magnetic member includes a predetermined number of magnets that are the N-pole magnets and S-pole magnets arranged alternately and circularly, and
the at least one magnetic detecting member is at least one Hall element that detects only N-poles of the N-pole magnets or S-poles of the S-pole magnets.

4. A seat belt retractor comprising at least:
a spool that retracts a seat belt;
a driving means for rotating the spool; and
a rotation amount detector that detects the rotation amount of the spool,
wherein the rotation amount of the spool is controlled by controlling the driving of the driving means on the basis of the rotation amount of the spool detected by the rotation amount detector,
the rotation amount detector is the position detector according to claim 3, and the moving member is the spool,
the rotation amount detector has a rotating disk including the magnetic member, the rotating disk has the predetermined number of magnets arranged concentrically with the rotating disk, and a driven member that is rotatable integrally with the predetermined number of magnets,
the seat belt retractor has a driving member provided rotatably integrally with the spool and transmitting the rotation of the spool to the driven member,
the seat belt retractor has a speed increasing mechanism that causes the rotation speed of the driven member to be greater than that of the driving member.

5. The seat belt retractor according to claim 4,
wherein the rotation amount detector is disposed eccentrically relative to the rotating shaft of the spool and in the radial direction of the rotating shaft,
the driven member is a driven gear, and the driving member is a driving gear meshing with the driven gear, and
the speed increasing mechanism includes the driven gear and the driving gear.

6. The seat belt retractor according to claim 4,
wherein the rotation amount detector is disposed eccentrically relative to the rotating shaft of the spool and in the radial direction of the rotating shaft,
the driven member is a driven pulley, and the driving member is a driving pulley, and
the speed increasing mechanism includes the driven pulley, the driving pulley, and an endless belt looped over the driven pulley and the driving pulley.

7. The seat belt retractor according to claim 4,
wherein the rotation amount detector is disposed concentrically with a rotating shaft of the spool, and
the speed increasing mechanism is a planetary gear mechanism.

8. The seat belt retractor according to claim 7,
wherein the driven member is a sun gear of the planetary gear mechanism, and
the driving member is a carrier of the planetary gear mechanism.

9. A seat belt apparatus comprising at least:
a seat belt retractor that retracts a seat belt;
a tongue that is slidably supported by the seat belt withdrawn from this seat belt retractor; and
a buckle with which the tongue is releasably engaged,
wherein the seat belt apparatus restrains an occupant with the seat belt, and
the seat belt retractor is the seat belt retractor according to any one of claims 4 to 8.

* * * * *